United States Patent
Davison, Jr. et al.

[15] 3,686,973
[45] Aug. 29, 1972

[54] METHOD AND APPARATUS FOR CONTROL OF TRANSMISSION BREATHING

[72] Inventors: Ellard D. Davison, Jr., Grosse Pointe Farms; Merrill L. Haviland, Birmingham, both of Mich.

[73] Assignee: General Motors Corporation, Detroit, Mich.

[22] Filed: Oct. 20, 1969

[21] Appl. No.: 867,546

[52] U.S. Cl. ...................................................74/606
[51] Int. Cl. ..............................................F16h 57/04
[58] Field of Search ...74/606, 763; 137/543.23, 525, 137/493.9, 454.5

[56] References Cited

UNITED STATES PATENTS

| | | | |
|---|---|---|---|
| 1,214,595 | 2/1917 | Sands | 137/543.23 |
| 2,103,935 | 12/1937 | Cossais | 137/493.9 X |
| 2,699,076 | 1/1955 | Youngren et al. | 74/763 |
| 2,941,544 | 6/1960 | Peras | 137/525 |
| 3,119,408 | 1/1964 | Patrick | 137/454.5 |
| 3,186,374 | 6/1965 | Heidner | 74/606 X |
| 3,314,306 | 4/1967 | Barclae | 74/606 |
| 3,384,113 | 5/1968 | Pennisi | 137/525 |

*Primary Examiner*—William F. O'Dea
*Assistant Examiner*—F. D. Shoemaker
*Attorney*—W. E. Finken, A. M. Heiter and Charles R. White

[57] ABSTRACT

Automatic transmission having suppressor valve construction which restricts transmission breathing to reduce oxidation of the lubricant fill. In one form there are flap valves which open and close under predetermined pressure conditions within the transmission to restrict the intake and exhaust of air or optionally of a gas, such as nitrogen, in a sealed system. In another form the suppressor valve has an elastic sleeve valve member which controls a breather passage by opening to allow the exhaust of air from the transmission and by closing to block air from entering the transmission. In another form the valve has a knife edge slit that is normally closed but which opens to permit the intake and exhaust of air under predetermined pressure conditions within the transmission. In another form of the invention there is a spring which holds a valve element on a valve seat to prevent intake of gas into the transmission through the valve but allows the gas to flow out of the transmission only under particular pressure conditions within the transmission.

8 Claims, 14 Drawing Figures

Patented Aug. 29, 1972
3,686,973
2 Sheets-Sheet 1
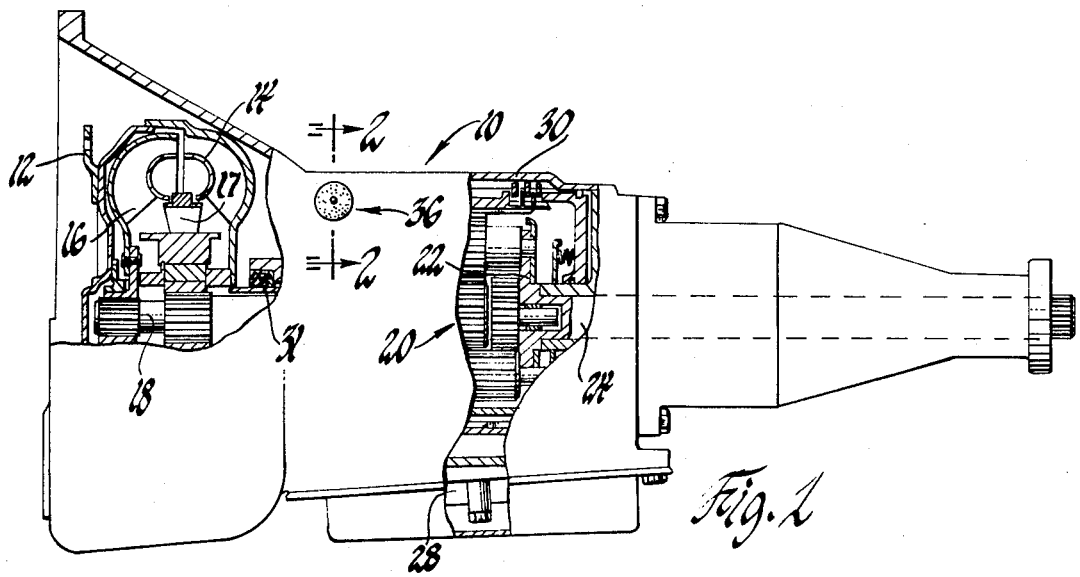
Fig. 1
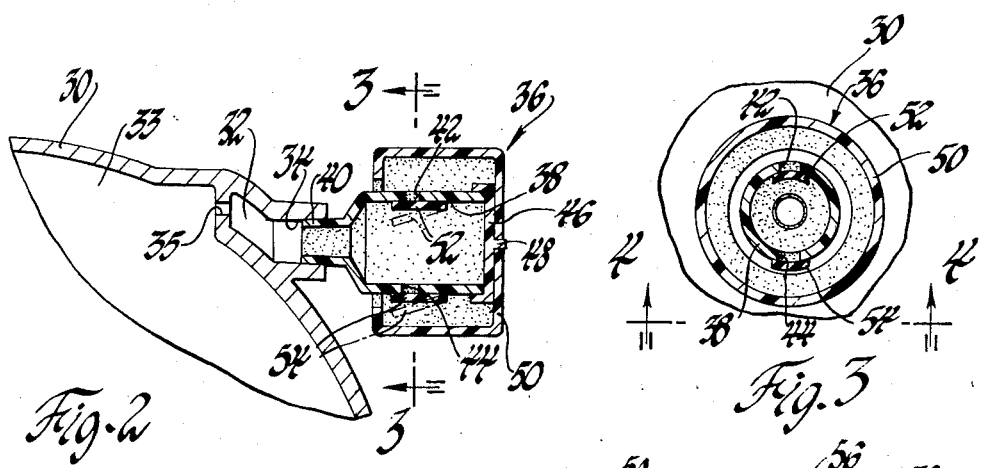
Fig. 2
Fig. 3
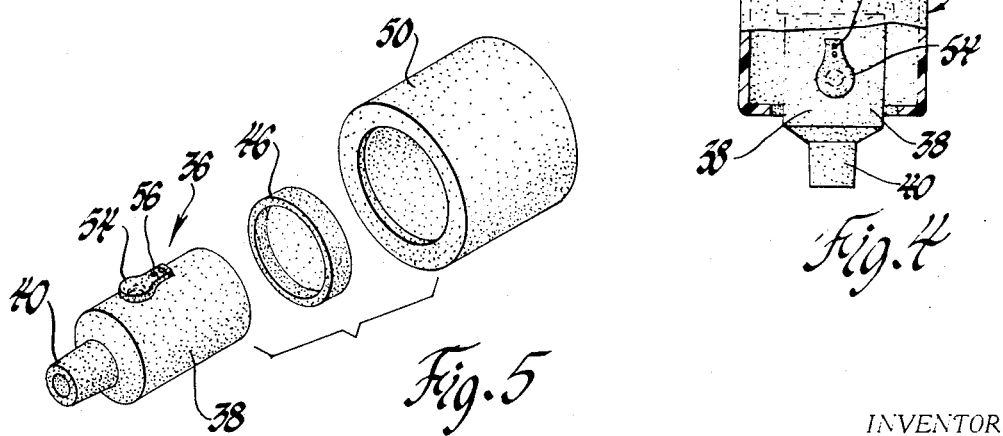
Fig. 5
Fig. 4
INVENTORS.
Ellard D. Davison, Jr. &
BY Merrill L. Haviland
Charles R. White
ATTORNEY Patented Aug. 29, 1972

INVENTORS
Ellard D. Davison, Jr. &
Merrill L. Haviland
BY
Charles L. White
ATTORNEY

METHOD AND APPARATUS FOR CONTROL OF TRANSMISSION BREATHING

This invention relates to automatic transmissions and more particularly to suppressor valves for controlling and limiting automatic transmission breathing to reduce oxidation of the lubricant fill.

In conventional automatic transmissions air flows into and out of the transmission through an air vent or breather tube during transmission operation. As temperatures in the transmission increase and as the lubricant expends, the air in the transmission expands and flows freely out of the vent into the atmosphere. Without provision for breathing pressure within the transmission would become so high that the seals would leak excessively. As temperatures in the transmission decrease and as the lubricant contracts, air flows freely into the transmission through the vent. During transmission breathing the air within the transmission readily mixes with the lubricant and causes undesired lubricant oxidation. At higher lubricant temperatures and during faster rates of breathing the oxidation is accelerated.

The oxidation of transmission lubricants has been a major cause of marginal performance and failure of automatic transmissions after long periods of use. Transmission lubricant drain intervals are recommended so that oxidized lubricant will not detract from transmission operation. When transmission lubricant oxidizes to the extent that the frictional properties of the lubricant are adversely changed, harsh shifts and possible failure of the transmission clutches and brakes are often experienced. Also, transmission failure could result from the blockage of the transmission lubricant pump screen by contaminants in the lubricant and from the sticking of the valves in the hydraulic controls. Oxidation causes the lubricant viscosity to increase which may cause malfunction of the transmission hydraulic control system, particularly in winter e.g., 0°. Highly oxidized transmission lubricant may cause clutch plate stick-slip and the acid formed as a result of lubricant oxidation attacks metal parts and elastomeric seals.

To reduce oxidation of transmission lubricant and to extend the lubricant service life, oxidation inhibitors such as zinc dialkyldithiophosphate have been employed with considerable success. These oxidation inhibitors reduce the rate of oxidation and lengthen the time span between transmission lubricant changes. However, these additives have increased the cost of the fill and are themselves subject to decomposition after limited periods of use which adversely affects their subsequent performance.

In this invention oxidation of the transmission lubricant is substantially reduced by a straight-forward valve construction which effectively suppresses automatic transmission breathing and which reduces or dispenses with the need for special oxidation inhibitors and which provides for the lifetime lubricant fill of the transmission. Lubricant oxidation is reduced since the special valve construction of this invention suppresses the breathing of the transmission during transmission operation. With this invention a method of controlling transmission breathing is provided to decrease and limit oxidation of the lubricant fill. In particular, this invention will greatly suppress or prevent the flow of large quantities of air into and out of the transmission and thereby control transmission breathing.

In one embodiment of this invention there is a single transmission breathing suppressor unit having separate flap valves for the intake and exhaust of air; the flap valves are controlled by positive and negative pressures within the transmission. In another embodiment this valve unit may be connected to a separate reservoir of air or nitrogen or other suitable gas to provide a completely sealed breathing unit to further reduce transmission lubricant oxidation. In a third embodiment of the invention the suppressor permits air to exhaust from the transmission through an air passage opening but blocks the intake of air through the opening into the transmission. In a fourth embodiment of the invention transmission breathing is controlled by a knife-edge restriction which opens and closes under predetermined pressure conditions to limit the breathing of the transmission. In a fifth embodiment of the invention there is a valve element held on a valve seat by a helical spring which allows the transmission to exhaust gas through the suppressor valve but which blocks the intake of gas through the valve. An adjusting nut is provided to change the force of the spring so that the valve element can be made to open at any desired pressure.

These and other features, objects and advantages of the invention will become more apparent from the following detailed description and drawings in which:

FIG. 1 is a side elevation view of the transmission.

FIG. 2 is a view taken along lines 2—2 of FIG. 1 which illustrates a first embodiment of the invention.

FIG. 3 is a view taken along lines 3—3 of FIG. 2.

FIG. 4 is a view taken along lines 4—4 of FIG. 3.

FIG. 5 is an axonometric view of the first embodiment of the invention.

Figure 6:
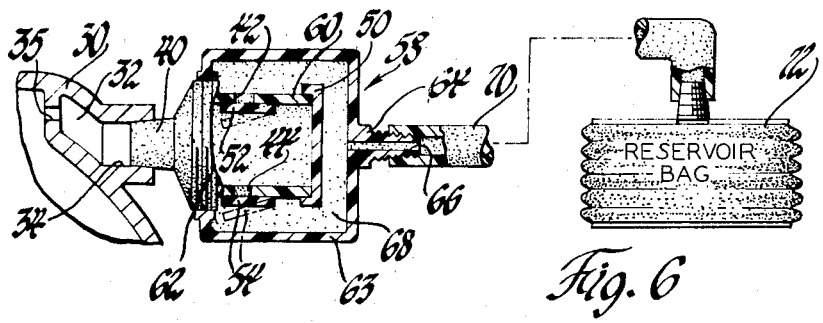
FIG. 6 is a view similar to FIG. 2 showing a second embodiment of the invention.

As shown in FIG. 1 there is an automatic transmission 10 having an input member 12 driving a pump 14 of a hydrodynamic torque converter. The converter has a bladed turbine 16 and a stator 17; the turbine is drivingly connected to an input shaft 18 which drives the sun gear of a planetary gearset 20. This gearset has an output carrier 22 operatively connected to an output shaft 24. In this transmission the gearing is controlled by conventional clutch and brake devices to condition the transmission for two forward speeds and one reverse speed. The transmission has a lubricant circulating pump of the internal-external gear type for pumping the lubricant needed from sump 28 at required pressures for operation of the transmission and controls. The transmission components are contained and sealed within a case or housing 30 by suitable seals such as annular front seal 31 so that air or gas cannot freely enter or exhaust from the transmission.

As shown best by FIG. 2 the housing 30 has a breather passage 32 with an opening 34 above the lubricant level; passage 32 leads in a circuitous path from the outside of the transmission housing to the interior 33 thereof. Opening 35 is shown for purposes of illustrating the communication of passage 32 and the interior 33.

As shown in FIGS. 1 and 2 the transmission has a breather suppressor assembly 36 which is securely mounted in the breather passage opening 34 located in the upper portion of the transmission housing. The details of the assembly are illustrated in FIGS. 2 through 5. The assembly comprises a valve body 38 which may be made of nylon or other suitable material, having a reduced funnel-like neck 40 which snugly fits within the opening 34. The valve body has an air inlet opening 42 and an air outlet opening 44 for transmission breathing purposes. The valve body supports a flanged cap 46 which may be made of nylon or other suitable material that closely fits over the outer end of the valve body and this cap has a central outwardly extending projection 48 that is pressed into an end wall of a cylindrical dust cover 50 to securely hold the cover on the valve body. The dust cover extends around the valve body to protect the air openings 42 and 44 and the flap valves. As shown, the dust cover has an open end which permits the cover to be readily installed on the cap 46 and which provides for the passage of air.

Flap valves 52 and 54 of nylon or other suitable material for covering and exposing the openings 42 and 44 respectively are operatively secured to the interior and exterior of the valve body by suitable fastening means such as by fasteners 56. This fastening normally keeps the flap valves in blocking position over their respective openings.

During operation, when the transmission attempts to take in air, the interior flap valve 52 will block the flow into the transmission housing until there is a predetermined negative pressure such as 2 psi vacuum. After this vacuum is reached, this flap valve opens to allow the air to pass into the transmission housing through opening 42. The exterior valve flap 54 will remain in a closed position. On continued transmission operation and after a predetermined higher pressure is reached, 2 psi above atmosphere for example, the flap valve 54 will open to allow the passage of air out of the transmission and flap valve 52 will block passage 42. By this valve mechanism breathing is accomplished by the opening and closing of the flap valves under predetermined pressure conditions within the transmission.

A second embodiment of the invention is illustrated in FIG. 6 in which the suppressor assembly 58 has a valve body 60 which is basically the same as valve body 38 but has a threaded section 62 on the outer periphery of the body on which is threaded a cylindrical outer cover 63. The parts of the valve 60 have corresponding parts with valve 38 and are identified with corresponding reference numerals. The cover has an outwardly projecting extension 64 with a passage 66 formed therethrough which communicates with chamber 68 provided between the cover and the valve. A hose 70 is fitted on the extension 64 which is connected to a flexible reservoir bag 72, which is charged with air, nitrogen, or other suitable gas.

In this embodiment the flap valves operate as previously described. When the air pressure inside of the transmission case drops to a predetermined negative pressure, the flap valve 52 opens to take in gas from the bag while the exhaust flap valve is tightly closed. When there is predetermined positive pressure within the transmission, the flap valve 52 tightly closes and the exhaust flap valve opens to let the air or gas flow out of passage 44 and through chamber 68 and hose 70 into the reservoir bag.

If air is used in the reservoir bag, oxidation of the transmission lubricant is reduced because the oxygen in the bag is soon consumed. If the bag is charged with a gas such as nitrogen, oxidation of the lubricant fill will be further minimized.

Figure 7:
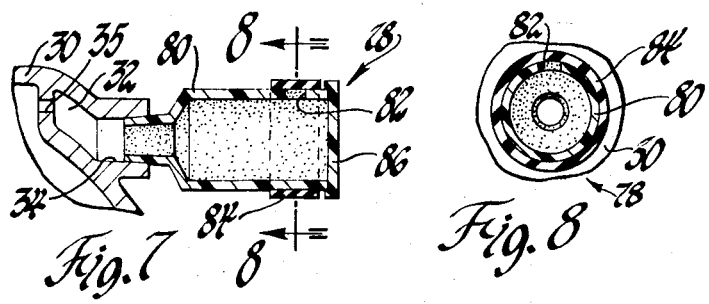
FIG. 7 is a view similar to FIG. 2 showing a third embodiment of the invention.
Figure 8:
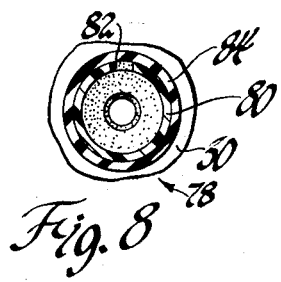
FIG. 8 is a view taken along lines 8—8 of FIG. 7.
Figure 9:
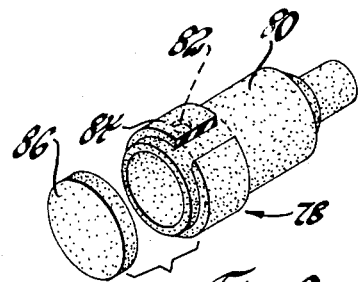
FIG. 9 is an axonometric view of the invention illustrated in FIGS. 7 and 8.

FIGS. 7, 8 and 9 illustrate a third embodiment of the invention in which there is a breathing suppressor valve 78 comprising a valve body 80 that is generally the same as the previously described valve bodies 38 and 60. Valve body 80 differs from the previously described valve bodies in that it has a single opening 82 for only exhausting air from the transmission case instead of both inlet and exhaust openings. Also, instead of flap valves there is an elastic band valve element 84 preferably of silicone rubber which has an internal diameter smaller than the outside diameter of the valve body 80. The band is stretched around the annular valve body to normally close the opening 82. The end of the valve body is closed with a cap 86 made out of nylon or suitable material which is pressed on or otherwise fixedly secured to the outer end of the valve body. If desired, a dust cover such as that illustrated in FIG. 2 may be used to shield the valve body and the valve element.

When pressure builds up inside of the transmission to 1 or 2 psi above atmospheric pressure, for example, the band valve element will slightly deflect to allow the air to exhaust from the transmission case. Below this pressure the valve element will seal the opening 82. When pressure decreases in the transmission to a vacuum e.g., 2 psi below atmosphere, the only air taken into the transmission is through the transmission seals such as front seal 31. By this means only a highly limited amount of air enters in the transmission case and air within the transmission is allowed to exhaust through the passage 82 only under predetermined pressure conditions within the transmission. Since breathing is highly restricted in this embodiment of the invention, there will be little or no oxidation of the transmission lubricant.

Figure 10:
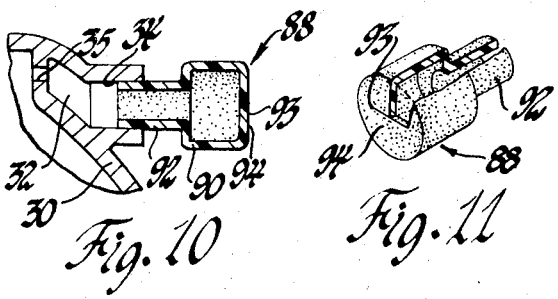
FIG. 10 is a view similar to FIG. 2 showing a fourth embodiment of the invention.
Figure 11:
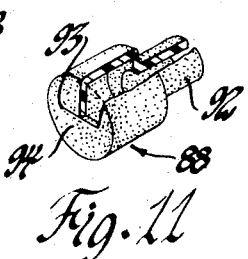
FIG. 11 is an axonometric view of the FIG. 10 construction.

Turning now to the fourth embodiment shown in FIGS. 10 and 11 there is a suppressor valve 88 comprised of a valve body 90 with a neck portion 92 that extends into the opening 34 in housing 30. The valve body 90 is preferably a one-piece construction of suitable material such as silicone rubber having a cylindrical head portion with a knife-edge valve slit 93 extending substantially across an end wall 94 of the valve body. This valve slit is normally closed to prevent the passage of air into and out of the transmission housing. However, under predetermined pressure conditions the valve slit will open for the passage of air therethrough. Thus, when a predetermined positive pressure appears in the transmission the valve slit opens to allow the air to exhaust from the housing and when there is a predetermined vacuum, the slit again opens to allow air to enter into the case. As in the other embodiments a suitable dust cover may be employed to provide protection for the valve body and the valve slit.

Figure 12:
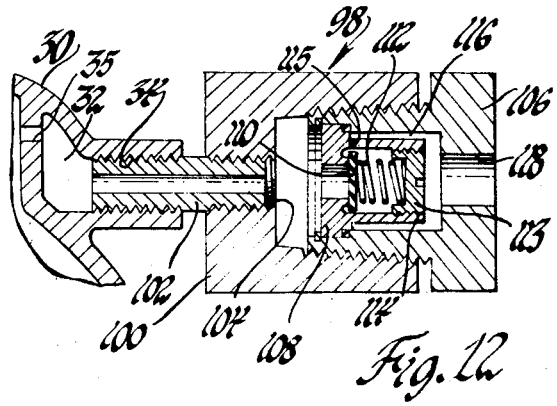
FIG. 12 is a view similar to FIG. 2 showing a fifth embodiment of the invention.

Another embodiment of the invention is shown in FIG. 12 in which there is a breathing suppressor assembly 98 having a cylindrical valve body 100. This valve body is securely connected to the transmission by a tubular pipe 102 threadedly connected into opening 34 of transmission housing 30 and into an opening 104 formed in one end of the valve body. The valve body is open at the other end and there is a threaded support and access member 106 that carries valve element support 108 within the valve body. The valve element support has an annular valve seat for sealing contact with movable disk-like valve element 110 preferably of an elastomeric material. This valve element is normally held on the valve seat by a coil spring 112 which has one end engaging the valve element and the other end engaging an adjusting nut 113 threaded into the inside of an extending sleeve portion 114 of the support 108. The nut has a bit or groove for the reception of a screwdriver so that it may be easily turned to adjust the force of spring 112.

At a predetermined gas pressure within the transmission the valve element, being open to this pressure through pipe 102, will lift off of the valve seat to let the transmission exhaust gas through opening 115 in the sleeve portion 114 and through the passage 116 formed between the outer wall of the sleeve portion 114 and the inner wall of access member 106. From passage 116 the exhausted gas will pass to the atmosphere through the central access opening 118 in access member 106. At positive pressures below the predetermined pressure the spring holds the valve element tightly on its seat and the transmission cannot exhaust air. Under vacuum conditions within the transmission the valve element experiences the additional seating force of atmospheric pressure so that the transmission cannot take in air through the valve and is therefore functionally similar to the embodiment of FIGS. 7–9.

Figure 13:
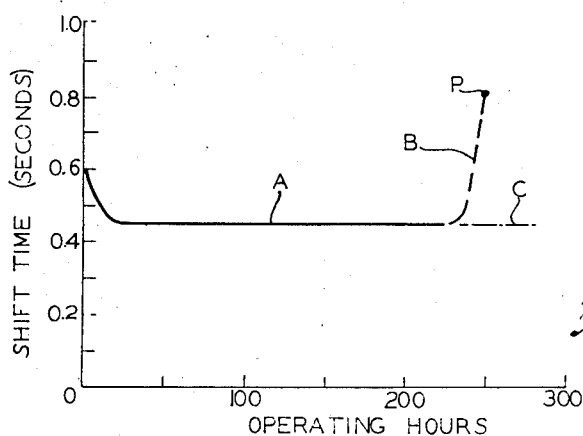
FIGS. 13 and 14 are curves comparing operation of the invention with conventional automatic transmission in tests conducted under the same operating conditions.

The curves illustrated in FIG. 13 are plots of transmission shift time in seconds versus transmission operating time in hours for a transmission having a conventional breather tube and for the same type transmission with the same type conventional liquid lubricant but having a breathing suppressor valve of this invention substituted for the breather tube. The breather suppressor valve employed was in accordance with the FIG. 12 construction. The solid line portion A of the plot represents operation of both transmissions and the shift times are highly satisfactory for a long period of operating hours as indicated with shifts after break-in taking 0.45 seconds. After about 230 hours of operation the oxidation of the fill lubricant in the transmission with the conventional breather tube has increased sufficiently to cause the shift time between low and high gear ratios to rapidly increase as shown by the dashed line portion B of the plot. At 250 hours, point P, 0.8 seconds are used to make the shift transition and with this time delay, the shifts are entirely unsatisfactory as a result of being severely harsh and not properly timed so that the transmission fails to adequately perform. This trend of rapidly increasing shift time indicates impending clutch destruction.

With the transmission employing the breathing suppressor valve of this invention, the shift time remains constant beyond 230 operating hours as indicated by the dot-dash curve C with no tendency to increase. In this case, since breathing is suppressed, oxidation is minimized and transmission operation is entirely satisfactory.

Figure 14:
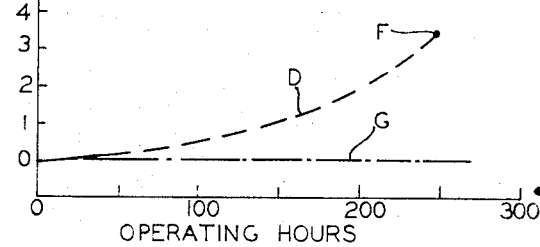

FIG. 14 shows curves which compare the oxidation as measured by an increase in total acid number of the same type conventional lubricant in a transmission with a conventional breather valve and a transmission of the same type having a breathing suppressor valve which permits air to flow only out of the transmission and which is like that of FIG. 12. Curve D illustrating oxidation of the transmission lubricant having the prior art breathing valve shows that lubricant oxidation steadily increases as the operating hours of the transmission accumulate. At point F lubricant is sufficiently oxidized to cause marginal transmission performance and failure. The dot-dash curve G shows that lubricant oxidation in a transmission utilizing breathing suppressor valve of this invention is insignificant during transmission operation and no transmission failure is experienced.

This invention is not limited to the details of the construction shown and described for purposes of disclosing principles of the invention for other modifications will occur to those skilled in the art.

What is claimed is:

1. In an automatic transmission, a housing for said transmission, a transmission lubricant fill in said housing subject to oxidation providing a medium for the transfer of power and for lubricating and operating said transmission, a transmission breather passage extending through the wall of said housing, and transmission suppressor valve means for said transmission in said breather passage to permit air pressure to build up inside of said housing until a predetermined pressure is reached and to subsequently open to allow said air to flow from said transmission housing to the atmosphere outside of said transmission housing and for subsequently permitting a vacuum to occur inside said housing until a predetermined vacuum has been obtained and thereafter to open to allow air to flow into said transmission from said outside atmosphere, said valve means having a surrounding outer container, an air tight connection securing said container to said valve means, an enclosed reservoir of gas, and passage means connecting said reservoir and said container so that said transmission will take in gas from said reservoir in response to predetermined vacuum within said housing and so that said transmission will exhaust gas from said transmission into said reservoir in response to predetermined pressure within said housing.

2. In an automatic transmission, a housing for said transmission, a transmission lubricant fill in said housing subject to oxidation providing a medium for the transfer of power and for lubricating and operating said transmission, a transmission breather passage extending through the wall of said housing, and transmission suppressor valve means for said transmission in said breather passage to permit air pressure to build up inside of said housing until a predetermined pressure is reached and to subsequently open to allow said air to flow from said transmission housing to the atmosphere outside of said transmission housing and for subsequently permitting a vacuum to occur inside said housing until a predetermined vacuum has been obtained and thereafter to open to allow air to flow into said transmission from said outside atmosphere, wherein said valve means has a valve body with first and second passages therethrough, a first flap valve for said first passage internally of said valve means for controlling the intake of air from said atmosphere and a second flap valve for said second passage external of said valve body for controlling the exhaust of air from said transmission.

3. In an automatic transmission having a housing with a liquid lubricant fill therein subject to oxidation providing a fluid medium for transferring power in said transmission and for lubricating the components of said transmission, a breather passage formed through the wall of said housing to allow the flow of gas therethrough, and transmission breathing suppressor valve means operatively disposed in said passage to permit the flow of gas from said transmission through said breather passage only after a predetermined gas pressure has built up within said transmission to thereby retard the oxidation of said lubricant and for permitting the flow of gas into said transmission after a predetermined vacuum occurs within said housing, said valve means comprising a valve body having a valve slit formed therein, and said valve slit being defined by adjacent walls in said body which normally close on one another and which open when there is a predetermined pressure within said housing to exhaust gas from said housing and which open when there is a predetermined vacuum within said transmission to intake gas into said housing.

4. The method of controlling and suppressing automatic transmission breathing so as to decrease oxidation of the lubricant fill within the transmission and thereby extend the service life of the fill comprising the steps of supplying in a controlled manner a gas from an enclosed reservoir into a transmission housing only when the gas pressure within said transmission housing drops below a predetermined value and exhausting in a controlled manner said gas from said transmission housing into the closed reservoir when the gas pressure within said housing rises above a predetermined value which is different from said first-mentioned predetermined value and for preventing the entry into or the exhaust from said transmission of said gas at the pressures between said first and second mentioned predetermined values.

5. In an automatic transmission having a hydrodynamic torque transmitting unit and a change-speed gear unit and a housing for said transmission, a transmission lubricant fill in said housing subject to oxidation for providing a medium for the transfer of power through said hydrodynamic torque transmitting unit and for lubricating and operating said transmission, a transmission breather passage extending through the wall of said housing, one-way transmission breather valve means for said transmission operatively disposed in said breather passage for permitting only the exhaust of gas from the interior of said housing and operative to permit gas pressure to build up inside of said housing in response to operation of said transmission until a predetermined gas pressure is reached and to subsequently open to allow said gas to flow only outwardly through said passage from said transmission housing to the atmosphere outside of said transmission, said transmission having said torque transmitting unit and said gear unit contained within said housing, and seal means for sealing the lubricant fill in said housing, and for permitting the limited intake of air into said transmission housing in response to a predetermined vacuum within said transmission housing and the closure of said valve means.

6. The automatic transmission defined in claim 5 wherein said valve means extends from said breather passage and projects outwardly from said transmission housing, said valve means having a movable external valve element operable to permit the passage of gas from said housing to the atmosphere in response to a predetermined gas pressure within said housing and to positively block the passage of air through said breather passage to the interior of said housing from said atmosphere.

7. In a transmission, an input and an output, a power transmitting gear unit, a housing for said gear unit, said input extending into said housing and being drivingly connected to said gear unit, said output being operatively connected to said gear unit and extending out of said housing, said housing containing a liquid lubricant for lubricating said gear unit and containing a gas above the normal liquid level of said lubricant, a breather passage extending into the housing and terminating above the level of said liquid lubricant for pneumatically connecting the interior of said housing with the atmosphere exterior of said housing, a one-way valve operatively disposed in said passage to permit a portion of the gas inside of said housing to be exhausted to the atmosphere in response to a rise in gas pressure within said housing to at least a predetermined positive gas pressure and for completely sealing said passage to prevent the passage of air into said housing through said passage in response to a gas pressure within said housing lower than said predetermined gas pressure, said housing having lubricant sealing means through which air may bleed into said housing from the atmosphere in response to the sealing of said breather passage by said valve means and when there is a sufficient negative gas pressure within said housing.

8. In a power transmitting device having a gear unit, a housing for said gear unit, a liquid lubricant contained in said transmission for lubricating said gear unit and containing a gas above the normal liquid level of said lubricant, a transmission air breather passage extending completely through the wall of said housing to form a passage above the level of said lubricant for pneumatically connecting the interior of said housing and the gas contained therein with the atmosphere outside of said housing, a one-way valve operatively disposed in said passage to permit a part of the gas in said housing to be exhausted to the exterior of said housing in response to a rise in gas pressure within said housing to a pressure equal to or greater than a predetermined gas pressure and for completely sealing said passage to prevent the passage of air into said housing through said passage when the gas pressure in said housing is below said predetermined pressure, an annular input shaft means extending into said housing drivingly connected to said gear unit, annular output shaft means operatively connected to said gear unit and extending out of said housing, and annular sealing means within said housing for contacting at least one of said shaft means for sealing said liquid lubricant within said housing through which air can feed into said housing from the exterior of said housing in response to the sealing of said breather passage by said one-way valve means and in response to the establishment of a predetermined vacuum within said housing.

* * * * *

UNITED STATES PATENT OFFICE
CERTIFICATE OF CORRECTION

Patent No. 3,686,973  Dated  August 29, 1972

Inventor(s) Ellard D. Davison, Jr. and Merrill L. Haviland

It is certified that error appears in the above-identified patent and that said Letters Patent are hereby corrected as shown below:

Column 1, line 3, delete "automatic"; line 4, delete "suppressor valves" and insert -- a method and to breather valve means --; line 5, delete "automatic". Column 2, line 34, delete "an axonometric" and insert -- a perspective --; line 45, delete "an axonometric" and insert -- a perspective --. Column 3, line 10, after "33" insert -- of the housing above the lubricant level --. Column 6, Claim 1, line 6, delete "and transmission"; delete lines 7 through 15; line 16, delete "said transmission from said outside atmosphere" and insert -- valve means for suppressing transmission breathing operatively disposed in said breather passage, said valve means having gas flow control means initially closed to block said breather passage and thereby permit the buildup of gas pressure inside of said housing with initial operation of said transmission and until a predetermined positive gas pressure in said housing opens said flow control means to relieve said pressure, said flow control means subsequently closing in response to the relief of said positive gas pressure with continued operation of said transmission allowing a vacuum to occur in said housing, said gas flow control means subsequently opening in response to a predetermined vacuum within said housing on further continued operation of said transmission to relieve said vacuum in said housing --; line 22, after "to" insert -- the occurrence of said --; line 25, after "predetermined" insert -- positive --. Column 6, Claim 2, line 6, after "transmission" insert -- breathing --. Column 7, line 4, before "permitting" insert -- closing and --. Column 8, line 12, after "said" insert -- breather passage by said --.

Signed and sealed this 10th day of April 1973.

(SEAL)
Attest:

EDWARD M. FLETCHER, JR.
Attesting Officer

ROBERT GOTTSCHALK
Commissioner of Patents